Sept. 16, 1952 S. D. BRADLEY 2,610,714
SEALING STRIP
Filed Nov. 28, 1951
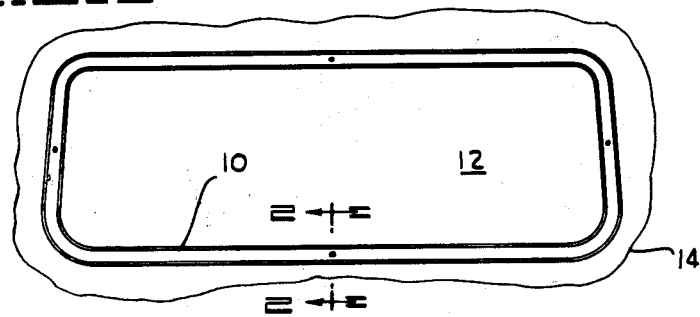
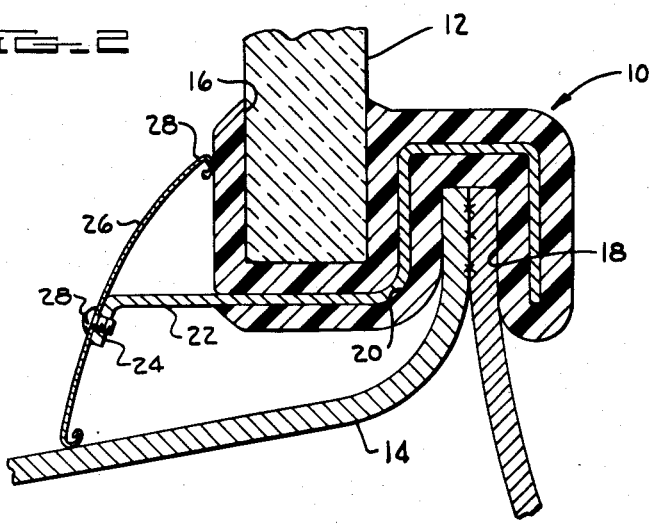
INVENTOR.
STEPHEN D. BRADLEY
BY
ATTORNEY Patented Sept. 16, 1952

2,610,714

UNITED STATES PATENT OFFICE 2,610,714

SEALING STRIP

Stephen D. Bradley, Detroit, Mich., assignor to Detroit Macoid Corporation, Detroit, Mich., a corporation of Michigan Application November 28, 1951, Serial No. 258,600

4 Claims. (Cl. 189—78)

1

The present invention relates to a sealing strip and particularly to a resilient sealing strip such as is utilized in joining separate panels in edge-to-edge relation. In the embodiment here shown by way of example, such a sealing strip may be used for mounting a fixed glass panel in an opening provided in a sheet metal panel. Particular examples of such use are found in the automobile industry wherein such glass panels are widely used as fixed windshields and as fixed rear body windows.

The sealing devices which have been used heretofore consist of an elastic or resilient extruded channel strip which provides a channel portion in which the edges of the glass panel are mounted, and in which other portions are provided for engaging with a structural part of the car body as for example, the edges of the sheet metal body panels for holding the said channel strip and the glass panel in place in the body opening. Due to variations in sizes of the glass panels and variations in the dimensions of the openings in sheet metal panels, it has been found that the glass-holding channel portion of the strip is frequently deformed in such a manner as to make difficult the proper water-tight attachment of the strip to both the glass panel and to the edges of the opening in the car body. Any space occurring between the sealing strip and the glass, or between the sealing strip and the body panels, must, therefore, be avoided to prevent leakage.

Where such prior sealing strips have been formed of an extruded rubber or resilient plastic composition, it has been found that the aging and deterioration of such materials will change its original resiliency in such a manner that leakages will occur both between the strip and the glass and between the strip and the edges of the opening in the body.

One solution for the above problems is taught in my copending application, Serial No. 64,639, filed December 10, 1948. The present application incorporates some of the novel features of the latter and, in addition, teaches a novel arrangement whereby the compression of the plastic extruded material can be adjusted when necessary, and further, the weather strip assembly, including the trim molding, can be readily assembled and installed.

It is a principal object of the present invention to provide a resilient sealing strip which provides a water-tight joint and a cushioned mounting for the edges of a glass panel mounted therein and in which a clamping member is combined with said sealing strip to draw the resilient sealing material into intimate water-tight contact with all joined edges of the connected panels and to maintain such intimate contact during the service life of the strip.

It is a further object of the present invention to provide a sealing strip which can be installed economically by unskilled workmen in large scale mass assembly of the panels to be joined by said sealing strip.

It is another object of the present invention to provide a sealing strip of the foregoing character which is adapted to be used with conventional types of trim moldings and which is constructed and arranged so that the molding, glass and extruded strip may be assembled in a jig and the entire assembly snapped into place in the body of the automobile for which it is adapted.

It is still another object of the present invention to provide a weather strip assembly of the foregoing character in which the extent of compression of the plastic extruded member can be adjusted so as to provide a weather-tight seal at all times.

Other objects of this invention will appear in the following description and appended claims, reference being had to the accompanying drawings forming a part of this specification wherein like reference characters designate corresponding parts in the several views.

In the drawings:

Fig. 1 is a front elevation of a fixed panel vehicle windshield in which a panel of glass is joined by the sealing strip of the present invention to the edges of the windshield opening in the sheet metal panel in the vehicle body which is fragmentarily shown; and Fig. 2 is an enlarged section taken on the line 2—2 of Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In its preferred embodiment the sealing strip of the present invention consists of a yieldable body portion comprising a preformed contoured non-metallic strip preferably formed of an elastomeric plastic such for example as a polyvinyl material or a rubber compound. Inside the body portion, a metallic body member is mounted to provide a clamping and holding element which holds the lips of the channels in the yieldable body portion in weather-tight engagement with the adjacent edges of the connected panels.

While the invention is here disclosed for use in automobile body construction, it is to be understood that its use is not limited to this field as the strip may be used to advantage in any construction where adjacent panel edges are to be joined in a weather-tight joint. Other adaptations of the present invention include, by way of example, panels used in prefabricated building constructions, window glass mountings used in all types of vehicles, and window glass mountings used in the construction industry, particularly the large fixed glass panels frequently identified as so-called "picture windows."

The yieldable non-metallic body portion is separately formed by any known molding or extrusion processes and can be supplied in long lengths from which portions of the proper length may be cut as desired. The metallic body member is inserted in a recess groove provided in the yieldable non-metallic body portion. Suitable lengths are cut off as required for the particular installation. In some instances, the strip is bent to extend around one of the panels to be joined and is united at its ends to form a continuous element. In other instances, it may be cut to lengths required to form mitered joints at the corners of the panel. In other instances, it may be used as a single length of strip for joining the edges of two panels of substantially equal lengths.

A sealing strip of the present invention is shown in Figs. 1 and 2 of the drawings wherein the sealing strip 10 comprises a yieldable non-metallic body which connects the fixed glass window shield panel 12 with the edges of the windshield opening provided in the body panel 14, and provides a resilient cushion therebetween and also seals the peripheral space between the edges of the joined panels. As shown in Fig. 2, the strip 10 is formed in one piece to provide a U-shaped glass retaining channel portion 16, which overlies the edge and a portion of the sides of the glass windshield panel 12.

The strip 10 is formed to provide an inverted U-shaped channel 18 for receiving and overlying the edge and part of the side portion of the opening in the body panel 14. A reversely curved channel 20 is provided in the strip 10 and extends for substantially the width of the same. A metal strip indicated generally by the numeral 22 is located in the channel 20 and extends outwardly therefrom to its distal end 24 which is adapted to have attached thereto the arcuate trim molding 26 by means of screws, such as shown at 28.

As can be seen, the metal strip 22 does not extend up the outer side of the strip 10 so as to clamp it against the glass panel 12 as is done in my invention disclosed in my aforesaid copending application. The function of clamping this outer portion of the strip 10 is carried out in the present invention by the trim molding 26 which is held in tight engagement therewith by the metal strip 22 and the screw 28. By virtue of this construction, the extent to which the strip 10 is compressed may be adjusted by varying the shape of the trim molding 26 or varying the setting of the screw 28.

In assembly, conventional types of trim molding may be used and the molding, glass, and extruded strip may be assembled in a jig and thereafter the entire assembly can be snapped in place in the vehicle body.

From the foregoing, it will be seen that a sealing strip and a weather strip assembly have been provided in which a yieldable non-metallic cushioning channel strip engages the edges of the panels to be connected, and in which the engagement between the channel strip and the edges of the panels is increased and strengthened by a deformable metallic strip inserted in an interior channel provided in the body of the said yieldable non-metallic cushioning channel strip. The metallic strip is readily deformed during mounting of the channels and acts to increase the tightness of the channel between the sealing strip and the faces of the joined panels. It remains as a permanent part of the sealing strip and continues to exert a clamping force on the resilient portions thereof during the entire service life of the strip. Further, the sealing strip is so constructed and arranged that it is adapted to be used with a conventional trim molding and the complete assembly, including the trim molding, the sealing strip, and the metallic strip therein can be assembled and readily mounted in the automobile.

Having thus described my invention, I claim:

1. A sealing strip for connecting adjacent edges of joined panels and for sealing the joint therebetween, said strip comprising a yieldable non-metallic cushioning strip having open channels for receiving the edges of the panels to be joined and having an internal channel, a metallic strip inserted in said internal channel and having an end portion extending around the closed end of one of said open channels so as to clamp the panel received therein, the opposite end portion of said metallic strip extending partially around the closed end of the other of said open channels and extending laterally therefrom, and means at the distal end of the latter end portion for securing a trim molding thereto.

2. In a weather strip assembly, a sealing strip for connecting adjacent edges of joined panels and for sealing the joint therebetween, said strip comprising a yieldable non-metallic cushioning strip having open channels for receiving the edges of the panels to be joined and having an internal channel, a metallic strip inserted in said internal channel and having an end portion extending around the closed end of one of said open channels so as to clamp the panel received therein, the opposite end portion of said metallic strip extending partially around the closed end of the other of said open channels and extending laterally therefrom, and means at the distal end of the latter end portion for securing a trim molding thereto, and an arcuate trim molding having its concave surface secured to said distal end and its edges extending along said joined panels.

3. In a weather strip assembly, a sealing strip for connecting adjacent edges of joined panels and for securing the joint therebetween, said strip comprising a yieldable non-metallic cushioning strip having open channels for receiving the edges of the panels to be joined and having an internal channel, a metallic strip inserted in said internal channel and having an end portion extending around the closed end of one of said open channels so as to clamp the panel received therein, the opposite end portion of said metallic strip extending partially around the closed end of the other of said open channels and extending laterally therefrom, and an arcuate shaped rim molding having its midportion secured to the distal end of said strip with its one edge adapted to abut the first-named panel, and its opposite edge adapted to abut said cushioning strip and in cooperation with said metallic strip to clamp the panel received in said other open channel.

4. In a weather strip assembly, a sealing strip for connecting adjacent edges of joined panels and for sealing the joint therebetween, said strip comprising a resilient sealing strip member having reversely opening channels therein for receiving the adjacent edges of the panels to be joined and having an internal channel therein extending from the closed end of one of said open channels to the opposite side of the other channel, and a metallic strip inserted in said internal channel and having an end portion extending outwardly therefrom, said metallic strip having its opposite end portion bent toward the first-named open channel so that a clamping pressure may be maintained on the resilient sealing strip member to form a weather-tight seal between the sealing strip member and the adjacent edges of the panel received in said first-named open channel, and a metallic molding secured to the end portion of said metallic strip and cooperating with the same so that a clamping pressure may be maintained on the resilient sealing strip member to form a weather-tight seal between the sealing strip member and the adjacent edges of the panel received in the second-named open channel.

STEPHEN D. BRADLEY.

REFERENCES CITED

The following references are of record in the file of this patent:

UNITED STATES PATENTS

| Number | Name | Date |
| --- | --- | --- |
| 2,261,038 | Sherts | Oct. 28, 1941 |
| 2,456,175 | Coppeck et al. | Dec. 14, 1948 |